March 29, 1966 S. LIPTON ETAL 3,243,400
PROCESS AND APPARATUS FOR EMULSIFYING BUTYL RUBBER
Filed Nov. 15, 1960
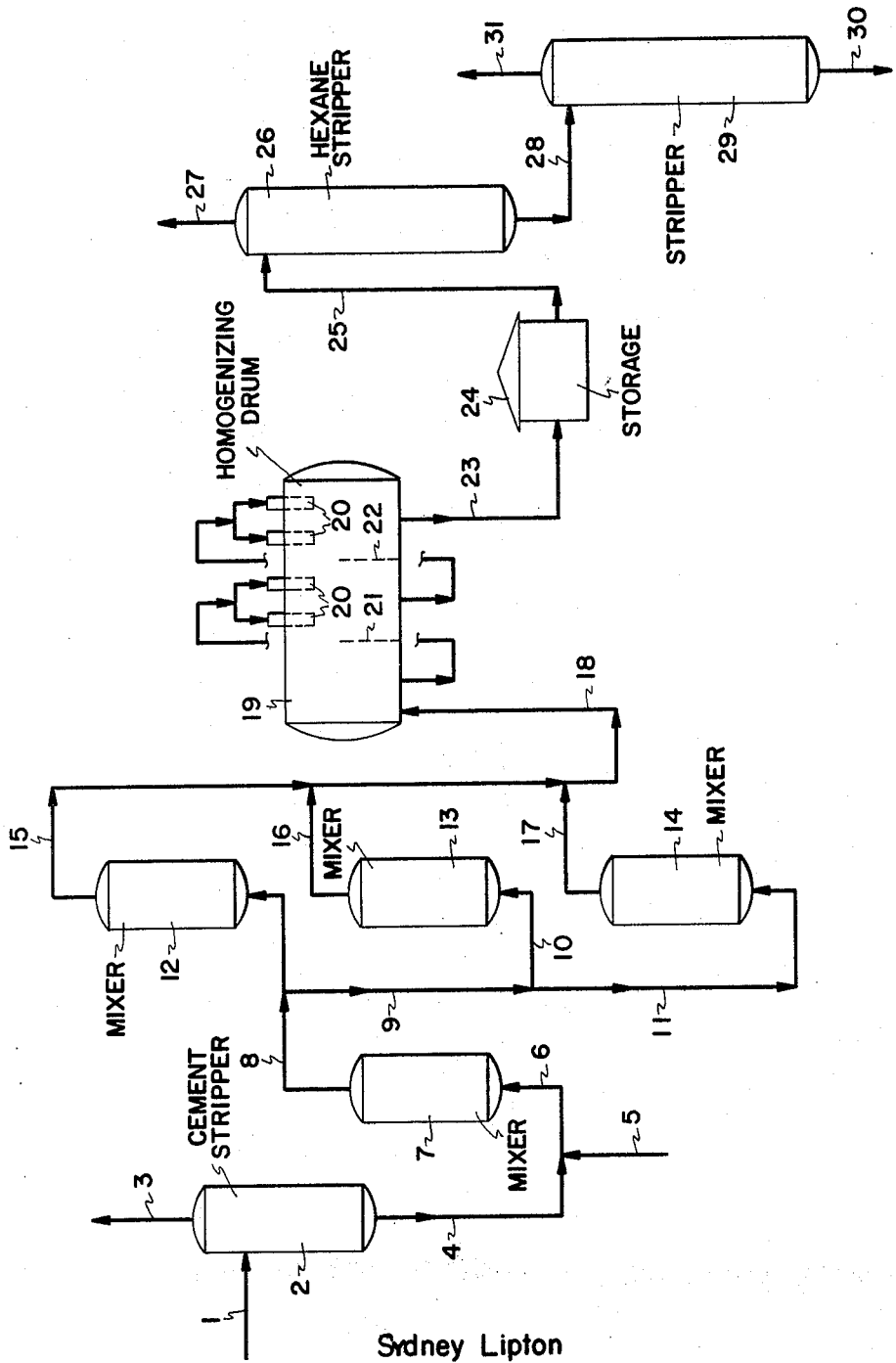
Sydney Lipton
Myron W. Belaga    Inventors
John L. Bryan, Jr.
By    Patent Attorney

3,243,400
PROCESS AND APPARATUS FOR EMULSIFYING BUTYL RUBBER

Sydney Lipton, Bayonne, Myron W. Belaga, Cranford, and John L. Bryan, Jr., Summit, N.J., assignors to Esso Research and Engineering Company, a corporation of Delaware
Filed Nov. 15, 1960, Ser. No. 69,473
2 Claims. (Cl. 260—29.7)

This invention relates to an improved process for preparing a latex from solid polymers and more particularly relates to a process for dispersing a viscous polymer solution in water.

It has already been proposed to form emulsions of highly polymerized organic compounds by dissolving them in organic solvents and then dispersing these solutions in water in the presence of emulsifying agents and finally removing the solvent. The preparation of emulsions or latices by this technique has not been realized commercially until recently in the preparation of butyl rubber latices. This lack of commercialization has been due to the fact that the only real outlet for polymer latices, heretofore, has been in connection with GR–S rubber or SBR as it is now called—a copolymer of butadiene and styrene. This polymer is actually polymerized as a latex and hence never exists in bulk form prior to the latex stage. However, with the development of butyl rubber and particularly in connection with its application to tires, a need arose for the production of a suitable latex. Since the polymer is not formed by emulsion polymerization, latices made from it must be prepared from the solid polymer. As indicated above, this requires first the formation of a solution of the polymer in a solvent, usually a hydrocarbon such as hexane.

When the original work was carried out in small scale batches, it was observed that an excellent latex could be prepared. However, upon translation of the process into a large scale, commercial operation serious difficulties arose. For example it had been found in small scale work that an excellent emulsion could be prepared by means of a two-stage homogenization. The first stage utilized a dispersator mixer in which the water, emulsifying agent and polymer was intimately mixed to form a crude emulsion having an average particle size of 0.6 to 0.7 microns. This emulsion was passed through one or more Rapisonic Homogenizers in which the materials are forced through an orifice or nozzle to impinge on a vibrating blade or knife edge, encased in a resonating bell. However upon conversion to large scale operations, it was soon found that the size of mixers or dispersators available on the market required the use of a plurality of these mixers in parallel in order to properly emulsify the huge volumes of polymer solution or cement needed. A single vessel simply would not give an emulsion having an average particle size small enough for introduction to the homogenizers so that the final latex would have the desired average particle size of about 0.5 micron. Unfortunately, however, it was not found possible to divide the highly viscous cement into equal portions to be supplied to each of the mixers. The usual type of flow controllers cannot be used successfully on materials having a viscosity of much above 50 cps. The viscosity of butyl rubber cements, having concentrations within commercially practical limits range between 5000 and 7000 cps. The use of pumps to divide the flow of cement is not satisfactory because the flow through the pump must be controlled and is difficult for the reasons given above. Furthermore, sealing such pumps against back flow is an additional problem.

It is therefore the main object of this invention to provide a method for overcoming the problems inherent in the handling of highly viscous polymers.

It is a further object of this invention to provide an improved process for making a butyl rubber latex having a commercially desirable particle size.

These and other objects of this invention are accomplished by first preparing a crude latex in a single mixing vessel and then dividing this crude latex into a plurality of equal streams and passing the streams in parallel flow through an additional mixer from which a latex is obtained which is suitable for passage through homogenizer nozzles for the preparation of the final raw latex. The raw latex is subsequently stripped to remove the solvent and if desired concentrated to remove any desired amount of water and excess emulsifier to yield the finished latex.

The butyl rubber used in preparing the latices of this invention is a copolymer of a major amount of isobutylene and a minor amount of a conjugated diolefin, having 4 to 14 carbon atoms, such as butadiene, isoprene and the like (see Hackh's Chemical Dictionary, 3rd Ed., page 151). The usual type of butyl rubber is a vulcanizable elastic copolymer of a major amount of isobutylene and a minor amount of isoprene, e.g., 97% isobutylene and 3% isoprene, prepared at low temperatures below 0° C. with Friedel Crafts catalysts, the preparation being described in U.S. Patent 2,356,128. If desired, the butyl rubber may be brominated or chlorinated and used as the starting material for the preparation of the latex of this invention.

This invention may be better understood from the following description when read in conjunction with the accompanying drawing.

Referring now to this drawing, butyl rubber cement containing 14 to 20 wt. percent of butyl rubber in hexane is introduced into stripping zone 2 through line 1. If desired any aliphatic hydrocarbon having 5 to 9 carbon atoms and boiling above 175° F. is suitable. Hexane is withdrawn through line 3 from the top of stripping zone 2 and a concentrated cement containing 20 to 30 wt. percent of butyl rubber is withdrawn from the bottom by means of line 4. Emulsifier and water is introduced through line 5 to provide 200 to 500 parts of water per 100 parts by weight of rubber. Emulsifiers which can be used include the alkali metal or ammonium salts of fatty or rosin acids containing 14 to 20 carbon atoms, e.g. oleic, palmitic, stearic, myristic, dihydroabietic acids and the like. Instead of a single acid, mixtures of acids may be used, especially such commercial mixtures as are obtained by the hydrolysis of naturally occurring fats and oils (e.g. tallow acids and tall oil acids). A particularly suitable emulsifier is an organic anionic sulfate containing 4 to 9 ethylene oxide units such as the sodium and ammonium salts of nonyl phenyl ether of polyoxyethylene sulfate, tridecyl ether of polyoxyethylene sulfate, and lauryl ether of polyoxyethylene sulfate, as described and claimed in U.S. Patent No. 2,936,295, issued May 10, 1960 to R. S. Brodkey and A. L. Miller. The total concentration of the emulsifying agents may vary between 2 and 7 parts by weight per 100 parts of rubber.

The mixture of cement, water and emulsifying agent is passed to mixer 7, generally a high speed mixer, such as the dispersator where the cement is agitated with the water and emulsifier. The resulting emulsion, having an average particle size above one micron and a viscosity below 50 cps. is withdrawn through line 8. Due to its markedly low viscosity as compared to the viscosity of the original cement (5000–7000 cps.) it can be easily handled and is therefore divided into a plurality of parallel streams, three being shown for illustration. These three streams are passed by lines 9, 10 and 11 to dispersators 12, 13 and 14, respectively, where the crude latex is subjected to additional mixing to bring its average particle size to 1 micron or below. The effluent from these dispersators flowing in lines 15, 16 and 17 are combined and passed by line 18 to drum 19 where the emulsion is passed repeatedly through rapisonic nozzles 20. Tank 19 is divided vertically into three zones by weirs 21 and 22, the emulsion cascading over the weirs to be recycled to the nozzles. Finished raw latex having an average particle size of about 0.5 micron or less is withdrawn through line 23 and passed to storage in tank 24.

The raw latex may then be finished by passing it by line 25 to tower 26 where it is stripped at 150–185° F. to remove hexane which is taken from the top of the tower through line 27. Latex, substantially free of hexane and having a concentration of 30–45% by weight of rubber is withdrawn by line 28 and passed to a second tower 29. This tower is similar to tower 26, except that it operates under a slight vacuum at a temperature of 170–185° F. to remove residual hexane and some water. A final latex having a solids concentration of 55% is removed through line 30.

It may be seen from the foregoing description that there has been provided a novel method whereby extremely viscous materials can be handled in the large quantities required in a commercial plant. Specifically, the invention provides a process for preparing latices or emulsions of viscous solutions of butyl rubber in hexane or other hydrocarbon known as cement by continuously mixing the cement with water containing an emulsifier and passing the mixture through a first high speed mixer to produce a crude latex having a greatly reduced viscosity, dividing said crude latex into a plurality of equal streams and passing each of said streams separately through a second high-speed mixer to prepare separate streams of raw latex, having an average particle size of about one micron, combining said separate streams and homogenizing said combined streams until a latex having an average particle size of 0.5 micron is obtained.

The foregoing description is illustrative of the present invention. However, it will be apparent to those skilled in the art that numerous variations and modifications are possible without departing from the spirit of the invention or scope of the claims.

The nature of the present invention having thus been fully set forth and illustrated, what is claimed as new and useful and desired to be secured by Letters Patent is:

1. A continuous process for preparing on a commercial scale large quantities of emulsions of viscous solutions of butyl rubber which is a copolymer of a major proportion of isobutylene and a minor proportion of a conjugated diolefin of 4 to 14 carbon atoms, which comprises dissolving butyl rubber in an aliphatic hydrocarbon having 4 to 14 carbon atoms to form a cement having a viscosity of 5000 to 7000 centipoise, mixing said cement with water containing an emulsifier, passing the mixture through a first mixing zone to produce a crude latex having a viscosity below 50 centipoise, dividing said crude latex into a plurality of equal streams and passing each of said streams separately through a second mixing zone to prepare separate streams of raw latex having an average particle size o fabout one micron, combining said separate streams and homogenizing the same until a latex having an average particle size of about 0.5 micron is obtained.

2. Process according to claim 1 in which the aliphatic hydrocarbon is hexane and the emulsifier is an organic anionic sulfate chosen from the group consisting of the sodium and ammonium salts of nonyl phenyl ether of polyoxyethylene sulfate, tridecyl ether of polyoxyethylene sulfate, tridecyl ether of polyoxyethylene sulfate and the lauryl ether of polyoxyethylene sulfate containing 4 to 9 ethylene oxide units.

References Cited by the Examiner

UNITED STATES PATENTS

| | | | |
|---|---|---|---|
| 1,911,644 | 5/1933 | Overbury | 252—359 |
| 2,595,797 | 5/1952 | Leyonmark et al. | 260—29.7 |
| 2,912,401 | 11/1959 | Aldridge et al. | 260—29.7 |
| 2,936,295 | 5/1960 | Brodkey et al. | 260—29.7 |

MURRAY TILLMAN, *Primary Examiner.*

DANIEL ARNOLD, *Examiner.*

LEON J. BERCOVITZ, WILLIAM H. SHORT, E. B. WOODRUFF, J. ZIEGLER, *Assistant Examiners.*